(12) United States Patent
Ouchi et al.

(10) Patent No.: US 7,203,397 B2
(45) Date of Patent: Apr. 10, 2007

(54) POLARIZATION MAINTAINING OPTICAL FIBER COUPLER AND METHOD OF MANUFACTURING SAME

(75) Inventors: Yasuhiro Ouchi, Sakura (JP); Daiichiro Tanaka, Sakura (JP)

(73) Assignee: Fujikura Ltd., Tokyo (JP)

( * ) Notice: Subject to any disclaimer, the term of this patent is extended or adjusted under 35 U.S.C. 154(b) by 632 days.

(21) Appl. No.: 10/637,537

(22) Filed: Aug. 11, 2003

(65) Prior Publication Data

US 2004/0033002 A1 Feb. 19, 2004

(30) Foreign Application Priority Data

Aug. 12, 2002 (JP) ............................ P2002-234981
Jul. 18, 2003 (JP) ............................ P2003-199269

(51) Int. Cl.
  G02B 6/26 (2006.01)
  G02B 6/42 (2006.01)
  G02B 6/02 (2006.01)
  C03B 37/023 (2006.01)

(52) U.S. Cl. ............................ 385/28; 385/30; 385/43; 385/123; 65/385

(58) Field of Classification Search ................ 385/123, 385/28, 23, 43, 48; 65/385
See application file for complete search history.

(56) References Cited

U.S. PATENT DOCUMENTS 4,612,028 A 9/1986 Abebe et al.
6,463,195 B1* 10/2002 Sasaki et al. .................. 385/43
7,050,672 B1* 5/2006 Matsumoto et al. .......... 385/28

FOREIGN PATENT DOCUMENTS

EP 1 079 247 A2 2/2001

(Continued)

OTHER PUBLICATIONS

"Reproducible Fabrication Method For Polarization Preserving Single-Mode Fiber Couplers" Journal Of Lightwave Technology, IEEE. New York, USA vol. 6, No. 7, Jul. 1, 1988, pp. 1191-1198, XP000005616 ISSN: 0733-8724

(Continued)

*Primary Examiner*—Brian Healy
*Assistant Examiner*—Charlie Peng
(74) *Attorney, Agent, or Firm*—Sughrue Mion, PLLC

(57) ABSTRACT

There is provided a polarization maintaining optical fiber coupler and a method of manufacturing this polarization maintaining optical fiber coupler in which manufacturing is simplified and excess loss is reduced. A polarization maintaining optical fiber coupler is provided in which, in at least one of the polarization maintaining optical fibers forming the fused and extended portion, the ratio of the [diameter of the core/the diameter of the cladding] or [the distance between the two stress applying portions/the diameter of the cladding] is greater than the ration of the [diameter of the core/the diameter of the cladding] or [the distance between the two stress applying portions/the diameter of the cladding in the portions of the polarization maintaining optical fibers that do not form the fused and extended portion]. In addition, in this polarization maintaining optical fiber coupler, in the fused and extended portion, the stress applying portions are enveloped by the cladding. Moreover, polarization maintaining optical fibers are used in which the distance between adjacent outer circumferences of the two stress applying portions is 20 μm or more.

9 Claims, 14 Drawing Sheets

FOREIGN PATENT DOCUMENTS

| | | |
|---|---|---|
| JP | 2-24605 | 1/1990 |
| JP | 03-056907 A | 3/1991 |
| JP | 03-056907 * | 12/1991 |
| JP | H4-315108 | 11/1992 |
| JP | H6-337324 | 12/1994 |
| JP | 2001-51150 | 2/2001 |
| JP | 2001-56416 | 2/2001 |
| JP | 2001-154058 | 6/2001 |
| JP | 2002-323637 | 11/2002 |

OTHER PUBLICATIONS

"Low Excess Loss Conditions of Polarization-Maintaining Fiber Couplers" Applied Optics, Optical Society of America, Washington, USA, vol. 27 No. 23, Dec. 1, 1988 pp. 4807-4813, XP000049631 ISSN: 0003-6935.

"Fabrication of Single-Polarisation Single-Mode-Fibre Couplers" Electronics Letters, Oct. 28, 1982, UK, XP002280739 ISSN: 0013-5194.

* cited by examiner

POLARIZATION MAINTAINING OPTICAL FIBER COUPLER AND METHOD OF MANUFACTURING SAME

BACKGROUND OF THE INVENTION

Priorities are claimed under 35 U.S.C. § 119 to Japanese Patent Applications Nos. 2002-234981 filed Aug. 12, 2002 and 2003-199269 filed Jul. 18, 2003, which are incorporated herein by reference.

1. Field of the Invention

The present invention relates to a polarization maintaining optical fiber coupler and, in particular, to a polarization maintaining optical fiber coupler that reduces loss generated in a fusion and extension process of a fused and extended portion.

2. Description of the Related Art

Various types of polarization maintaining optical fiber couplers have been proposed, and the polarization maintaining and absorption reducing (PANDA) type optical fiber is typical.

FIG. 18 is a cross-sectional view showing an example of a PANDA type optical fiber. This PANDA type optical fiber 10 is formed with a core 11 provided in the center of the optical fiber 10, cladding 12 that is provided in the shape of a concentric circle formed around the core 11 and that has a refractive index lower than that of the core 11, and two stress applying portions 13, each having a circular cross section, that are symmetrically centered around the core 11 within the cladding 12 and that have a refractive index lower than that of the cladding 12. The outer diameter of this PANDA type optical fiber 10 is approximately 125 μm.

Diameter narrowing processing is not performed on this PANDA type optical fiber 10, and the distance between adjacent outer circumferences of the two stress applying portions 13 is approximately 20 μm or less.

The stress applying portions 13 have a coefficient of thermal expansion that is greater than that of the cladding 12. Consequently, in a process to cool a PANDA type optical fiber 10 obtained by melting and drawing out an optical fiber base material, distortion is generated in the cross section of the PANDA type optical fiber 10 caused by the stress applying portions 13.

This distortion generates anisotropic distortion in the core 11. As a result, if the two orthogonal polarizations forming the light are taken as X polarization (slow polarization) and Y polarization (fast polarization), the propagation constant of the X polarization has a different value from the propagation constant of the Y polarization. Naturally, the distribution of the magnetic fields of these polarizations are also different. As a result, it is possible to obtain a characteristic in which propagation takes place in a state in which the X polarization and the Y polarization are saved.

An optical coupler manufactured using a polarization maintaining optical fiber such as the PANDA type optical fiber 10 described above is a polarization maintaining optical fiber coupler. In particular, it is known that a fused and extended type of polarization maintaining optical fiber coupler can not only be connected to external optical fibers with only a small amount of loss, but is excellent with regard to manufacturability, dependability, resistance to high optical power, and the like. This type of polarization maintaining optical fiber coupler is an effective optical component when used as an optical fiber sensor or for coherent optical communication.

FIG. 19 is a perspective view showing an example of a polarization maintaining optical fiber coupler manufactured using a normal PANDA type optical fiber.

This polarization maintaining optical fiber coupler 15 is formed by the following process. First, if necessary, a portion of a covering layer formed by plastic or the like provided on the surfaces of two PANDA type optical fibers 10 is removed therefrom. Next, the two PANDA type optical fibers 10 are adjusted and aligned such that the slow polarization axes of each are parallel. The two claddings 12 partway along the two PANDA type optical fibers 10 are then placed against each other, heated, and melted. In addition, the PANDA type optical fibers 10 are extended in the longitudinal directions to form a fused and extended portion (an optically coupled section) 14. Thereafter, if necessary, the fused and extended portion 14 is housed in a protective case (not shown) or the like that protects it from damage (see, for example, Patent Document 1 described below). Note that the slow polarization axis refers to a straight line passing through the centers of the stress applying portions 13 in each of the PANDA type optical fibers 10.

Such types of polarization maintaining optical fiber coupler include those that: (1) separate light of a specific wavelength; (2) separate and couple light of different wavelengths (for example, polarization maintaining wavelength division multiplexing (WDM) couplers and the like); and (3) separate and couple two intersecting polarization components (for example, polarization beam combiners, polarization beam splitters, and the like).

Patent Document 1—Japanese Patent Application Unexamined Publication No. 2002-323637.

Polarization maintaining optical fiber couplers manufactured by the fusion and extension of polarization maintaining optical fibers, as is described above, have a problem because excess loss tends to be generated in the fused and extended portion (i.e., loss generated in the fused and extended portion) by the manufacturing process. The problem of excess loss being easily generated is not limited to polarization maintaining optical fiber couplers that use PANDA type optical fibers, but is also generated in the same manner in polarization maintaining optical fiber couplers that use other polarization maintaining optical fibers such as Bow-Tie type optical fibers and the like.

As is described in Patent Document 1, one method of reducing this excess loss is to adjust the manufacturing conditions such that excess loss is at a minimum and then manufacture a polarization maintaining optical fiber coupler while monitoring the degree of optical coupling and the excess loss of the optical fiber couplers.

However, if excess loss increases temporarily during the fusion and extension of a polarization maintaining optical fiber, wavelength dependency of the excess loss of the polarization maintaining optical fiber coupler also increases and it becomes difficult for the polarization maintaining optical fiber coupler to be used in applications having a broad used bandwidth. Moreover, the task of adjusting manufacturing conditions such that excess loss is at a minimum in order to obtain the desired coupling characteristics is a barrier to improving productivity.

The present invention was conceived in view of the above circumstances and it is an object thereof to provide a polarization maintaining optical fiber coupler and production method for the same that allow manufacturing to be simplified and that reduce excess loss.

SUMMARY OF THE INVENTION

In order to solve the above problems, according to one aspect of the present invention, there is provided a polarization maintaining optical fiber coupler including: a plurality of polarization maintaining optical fibers, each having a core, cladding surrounding the core, and two stress applying portions within the cladding that are arranged symmetrically around the core, the plurality of polarization maintaining optical fibers being arranged parallel to each other and having a portion in a longitudinal direction thereof fused and extended so as to form a fused and extended portion, wherein the ratio of [a diameter of the core/a diameter of the cladding] or [a distance between the two stress applying portions/a diameter of the cladding] in at least one of the polarization maintaining optical fibers at the fused and extended portion is greater than the ratio of [a diameter of the core/a diameter of the cladding] or [a distance between the two stress applying portions/a diameter of the cladding] in portions of the polarization maintaining optical fibers that do not form the fused and extended portion, and wherein in the fused and extended portion, the stress applying portions are covered by the cladding.

In the polarization maintaining optical fiber coupler having the structure described above, it is preferable that the distance between the adjacent outer circumferences of the two stress applying portions is 20 µm or more in the polarization maintaining optical fibers.

The polarization maintaining optical fiber coupler having the structure described above can also be a polarization beam combiner or a polarization beam splitter.

The polarization maintaining optical fiber coupler having the structure described above can also be a polarization maintaining wavelength division multiplex coupler.

In the polarization maintaining optical fiber coupler having the structure described above, it is preferable that the polarization maintaining optical fiber is a PANDA type optical fiber.

In the polarization maintaining optical fiber coupler having the structure described above, it is preferable that the polarization maintaining optical fiber is a Bow-Tie type optical fiber.

According to another aspect of the present invention, there is provided a method of manufacturing a polarization maintaining optical fiber coupler including a plurality of polarization maintaining optical fibers, each having a core, cladding surrounding the core, and two stress applying portions within the cladding that are arranged symmetrically around the core, the plurality of polarization maintaining optical fibers being arranged parallel to each other and having a portion in a longitudinal direction thereof fused and extended so as to form a fused and extended portion, including: removing an outer peripheral portion of the cladding in a portion in a longitudinal direction of at least one of the polarization maintaining optical fibers to narrow a diameter of the at least one of the polarization maintaining optical fibers without exposing the stress applying portions; and fusing and extending the narrowed portion to form the fused and extended portion.

In the method of manufacturing a polarization maintaining optical fiber coupler having the structure described above, it is preferable that the distance between adjacent outer circumferences of the two stress applying portions is 20 µm or more in the polarization maintaining optical fibers.

In the method of manufacturing a polarization maintaining optical fiber coupler having the structure described above, it is preferable that a length of the narrowed portion of the polarization maintaining optical fiber is 40 mm or less.

DETAILED DESCRIPTION OF THE INVENTION

Before describing the present invention a brief explanation will first be given as to the reasons why excess loss increases in a polarization maintaining optical fiber coupler.

Figure 1:
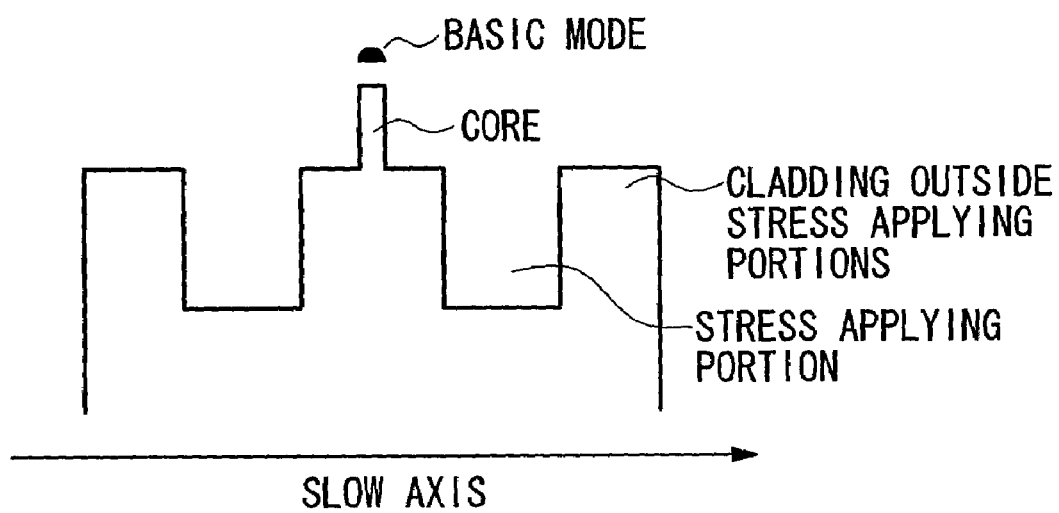
FIG. 1 is a graph showing refractive index distribution in an axial (slow axis) direction connecting two stress applying portions of a PANDA type optical fiber.

FIG. 1 is a graph showing refractive index distribution in an axial (slow axis) direction connecting two stress applying portions of a PANDA type optical fiber.

In a PANDA type optical fiber that has not undergone fusion and extension, as is shown in FIG. 1, the basic mode of incoming light is propagation inside the core.

A polarization maintaining optical fiber coupler is manufactured by heating and fusing and extending two of these PANDA type optical fibers. Because the PANDA type optical fiber is narrowed in diameter at the fused and extended portion, the core diameter is also narrowed and the mode field diameter is also reduced. Therefore, light that is trapped inside the core gradually begins to leak into the cladding. If this leaked light can be completely coupled with the other PANDA optical fiber there is no increase in excess loss.

However, because the stress applying portions of the PANDA optical fiber obstruct the coupling of the light creating anisotropy in the electric field distribution, excess loss is generated. Here, the phrase "the stress applying portions obstruct the coupling of the light" refers to the fact that, because the stress applying portions are areas with a lower refractive index than the cladding, light does not enter into those portions and the light is coupled at a particular anisotropy.

The reason why excess loss tends to increase in this manner in a polarization maintaining optical fiber coupler is because stress applying portions having a low refractive index are present in the cladding.

The increase in the excess loss during the extension, as is described above, is not limited to PANDA optical fibers and also applies in the case of other polarization maintaining optical fibers such as Bow-Tie type optical fibers and the like.

The present invention will now be described in detail.

Figure 2:
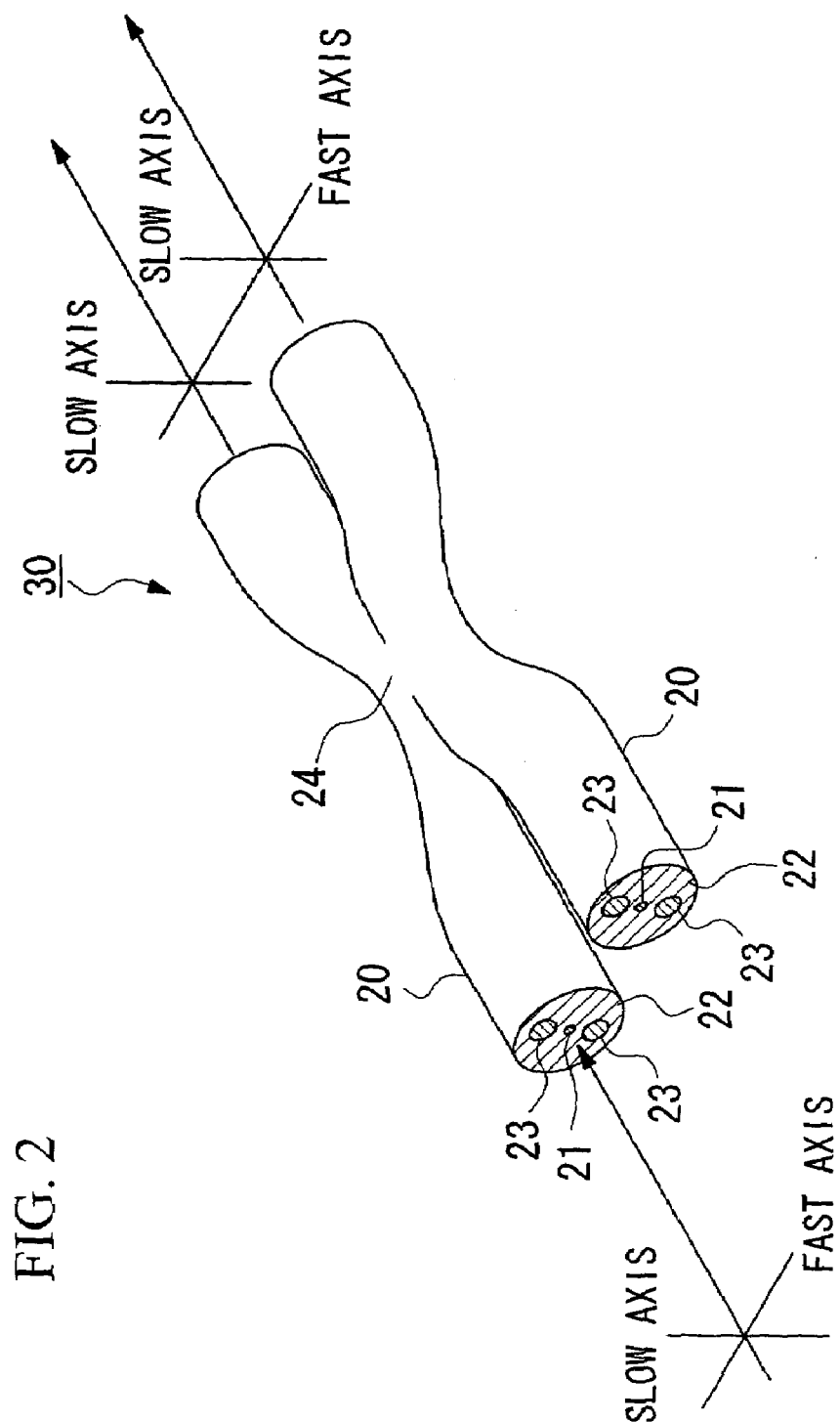
FIG. 2 is a perspective view showing an example of one embodiment of the polarization maintaining optical fiber coupler of the present invention.

FIG. 2 is a perspective view showing an example of the polarization maintaining optical fiber coupler of the present invention.

The polarization maintaining optical fiber coupler 30 of this example is formed by the following process. First, if necessary, a portion of a covering layer formed by plastic or the like provided on the surfaces of two PANDA optical fibers 20 is removed therefrom. Next, the two PANDA optical fibers 20 are adjusted and aligned such that the slow polarization axes of each are parallel. The two claddings 22 partway along the two PANDA optical fibers 20 are then placed against each other, heated, and melted. In addition, they are extended in the longitudinal directions to form a fused and extended portion (an optically coupled section) 24. Thereafter, if necessary, the fused and extended portion 24 is housed in a protective case (not shown) or the like that protects it from damage. Note that the slow polarization axis refers to a straight line passing through the centers of the stress applying portions 23 in each of the PANDA optical fibers 20.

In the polarization maintaining optical fiber coupler 30 of the present invention a portion of the PANDA optical fiber 20 is narrowed in diameter and the fused and extended portion 24 is formed at this narrowed portion.

In the PANDA optical fibers 20 having the narrowed portion, a portion in the longitudinal direction thereof is narrowed in diameter such that the thickness of the cladding 22 on the outside of the two stress applying portions 23 is thinner along an axis connecting the centers of the two stress applying portions 23.

Because the fused and extended portion is formed at this narrowed portion, it is preferable that the ratio of the [diameter of the core 21/the diameter of the cladding 22] or [the distance between the two stress applying portions 23/the diameter of the cladding 22] of at least one of the PANDA optical fibers 20 forming the fused and extended portion 24 is greater than the ratio of the [diameter of the core 21/the diameter of the cladding 22] or [the distance between the two stress applying portions 23/the diameter of the cladding 22] in the portions of the PANDA optical fibers 20 that do not form the fused and extended portion 24.

A method of removing the cladding 22 by etching with hydrofluoric acid and a method of grinding the cladding 22 are used as the method of narrowing the diameter of a portion in the longitudinal direction of the PANDA optical fiber 20. At this time, it is preferable that the cladding 22 of the narrowed portion covers the stress applying portions 23, and that the stress applying portions 23 are not exposed.

If the stress applying portions 23 of the PANDA optical fiber 20 that has been narrowed in diameter by etching or grinding are exposed at the surface of the cladding 22, the polarization maintaining ability of the PANDA optical fiber 20 deteriorates markedly, and the value of the polarization cross talk of the PANDA optical fiber 20 deteriorates.

Moreover, because the mechanical strength of the PANDA optical fiber 20 also deteriorates, it is preferable that a thin film of cladding 22 remains to a certain extent outside the stress applying portions 23.

If, however, the cladding 22 outside the stress applying portions 23 of the PANDA optical fiber 20 is sufficiently thick, then sufficient mechanical strength can be ensured. However, if the fused and extended section is formed by fusing and extending the PANDA optical fiber 20, the distance between the cores 22 of the two PANDA optical fibers 20 is increased. Because the coupling of the light tends to become more easily obstructed by the stress applying portions 23 of the PANDA optical fiber 20 by the same amount as this distance excess loss is generated.

In the PANDA optical fiber 20 it is preferable that the thickness of the cladding 22 outside the two stress applying portions 23 is 10 µm or less on an axis connecting the centers of the two stress applying portions 23.

If the thickness of the cladding 22 outside the two stress applying portions 23 on an axis connecting the centers of the two stress applying portions 23 exceeds 10 µm, sufficient mechanical strength can be ensured in the PANDA optical fiber 20. However, if the fused and extended section 24 is formed by fusing and extending the PANDA optical fiber 20, then excess loss occurs more easily.

Furthermore, in the PANDA optical fiber 20 it is preferable that the distance between adjacent outer circumferences of the two stress applying portions 23 on an axis connecting the centers of the two stress applying portions 23 is 20 µm or more, preferably 22 µm or more.

If the distance between adjacent outer circumferences of the two stress applying portions 23 is less than 20 µm, the time required to narrow the diameter of the PANDA optical fiber 20 using an etching method or the like is lengthened. In contrast, if the distance between adjacent outer circumferences of the two stress applying portions 23 is 20 μm or greater, then because the thickness of the cladding 22 outside the two stress applying portions 23 is thin in the PANDA optical fiber 20 even before it is narrowed in diameter, the time required to narrow the diameter of the PANDA optical fiber 20 is only a short time, thereby providing the advantage that the work time can be considerably shortened.

Figure 3:
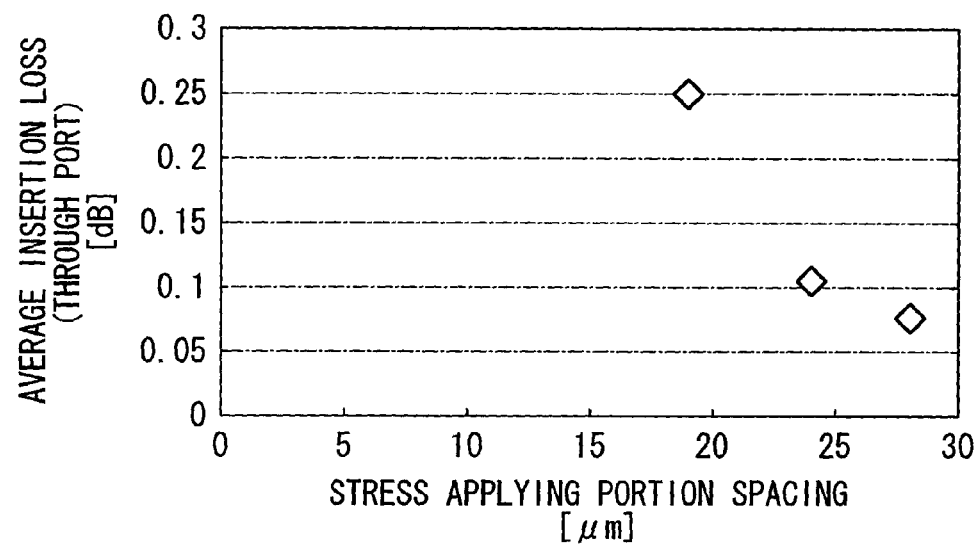
FIG. 3 is a graph showing a relationship between stress applying portion spacing and average insertion loss of a polarization maintaining optical fiber coupler.

Here, two each of three standard PANDA optical fibers having different spacings between stress applying portions (i.e., the distances between adjacent outer circumferences of two stress applying portions) were prepared, and 1% PANDA couplers capable of being used in the 1550 nm band were manufactured. The results when average insertion losses were then measured are shown in FIG. 3. At this time, the thicknesses of the cladding outside the stress applying portions were uniformly set at 5 μm. From FIG. 3 it can be seen that if the spacing between stress applying portions exceeds 20 μm, then the average insertion loss can be held to approximately 0.2 dB. If the spacing between stress applying portions is widened to approximately 22 μm or more the insertion loss can be held to approximately 0.15 dB.

It is preferable that the length of the PANDA optical fiber 20 where the outer diameter thereof is narrowed is 40 mm or less, and for reasons of practicality, is preferably to be between 5 mm and 30 mm. If the length of the PANDA optical fiber 20 where the diameter is narrowed exceeds 40 mm, the mechanical strength of the PANDA optical fiber 20 deteriorates markedly.

Figure 4:
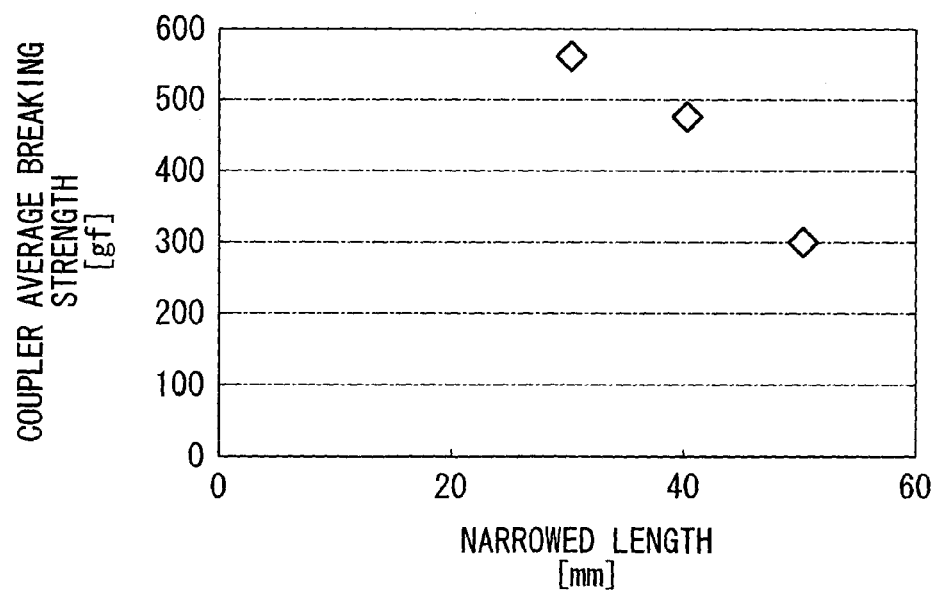
FIG. 4 is a graph showing a relationship between the length of a PANDA type optical fiber with a narrowed diameter and the average breaking strength of a polarization maintaining optical fiber coupler.

Here, FIG. 4 shows the average breaking strength when optical fiber couplers are manufactured with the length of the. Narrowed portion being changed. At this time, the outer diameter of the PANDA optical fiber is narrowed to 90 μm. If the length of the PANDA optical fiber 20 where the diameter is narrowed exceeds 40 mm it can be seen that the average breaking strength of the coupler deteriorates considerably. Moreover, if the length of the PANDA optical fiber 20 where the diameter is narrowed exceeds 40 mm then the work efficiency when a polarization maintaining optical fiber coupler is being manufactured deteriorates, and the size of the polarization maintaining optical fiber coupler also ends up increasing.

Furthermore, the polarization maintaining optical fiber coupler 30 of this example controls the degree of coupling of polarization in the slow axial direction and/or the degree of coupling of polarization in the fast axial direction of the PANDA optical fiber 20. If the coupling ratio of one polarization is 0% and the coupling ratio of the other polarization is 100%, then the polarization maintaining optical fiber coupler 30 of this example also operates as a polarization beam combiner or a polarization splitter. If, in this manner, the coupling ratio of one polarization is 0% and the coupling ratio of the other polarization is 100%, then, when slow polarization is taken in via one entry port 1 and fast polarization is taken in via another entry port 2, the slow polarization and fast polarization are multiplexed and output from a single exit port and the polarization maintaining optical fiber coupler 30 operates as a polarization beam combiner. If slow polarization and fast polarization are both input simultaneously via a single entry port, or if circularly polarized light is input, then the light is split into slow polarization and fast polarization and is output from the respective exit ports, and the polarization maintaining optical fiber coupler 30 operates as a polarization beam splitter.

In addition, the polarization maintaining optical fiber coupler 30 controls the coupling ratio of polarization in the slow axial direction and/or the coupling ratio of polarization in the fast axial direction of the PANDA optical fiber 20. If the degree of coupling of the polarization in the slow axial direction used by signal light is 100% and if the polarization in the slow axial direction of the wavelength used by pump light and/or the coupling ratio in the fast axial direction is 0%, then the polarization maintaining optical fiber coupler 30 operates as a polarization maintaining wavelength division multiplexing (WDM) coupler. For example, if fast polarization at 1550 nm is 100% coupled with the other fiber and the coupling ratio of the 980 nm pump light is held to 0%, then a polarization maintaining WDM is achieved.

When manufacturing these optical components there is no increase in excess loss due to fusion and extension of the polarization maintaining optical fiber.

Note that in the polarization maintaining optical fiber coupler 30 of this example, a PANDA optical fiber 20 is used as the polarization maintaining optical fiber. However, the polarization maintaining optical fiber coupler of the present invention is not limited to this and it is also possible for a Bow-Tie type optical fiber to be used as the polarization maintaining optical fiber. When using a Bow-Tie type optical fiber it is still possible to manufacture a polarization maintaining optical fiber coupler having almost the same structure as that obtained when a PANDA type optical fiber structure is used. Moreover, in the polarization maintaining optical fiber coupler 30 of this example, two PANDA optical fibers 20 are used. However, the polarization maintaining optical fiber coupler of the present invention is not limited to this. The polarization maintaining optical fiber coupler of the present invention may also have a fused and extended portion that is formed by fusing and extending a portion in the longitudinal direction of three or more polarization maintaining optical fibers.

In this manner, in the polarization maintaining optical fiber coupler of the present invention, a portion of the cladding of a polarization maintaining optical fiber is narrowed in diameter by an etching method or grinding method and a fused and extended portion is formed in the narrowed portion of the polarization maintaining optical fiber. As a result, there is no increase in excess loss in the process to extend the polarization maintaining optical fiber, and a polarization maintaining optical fiber coupler having excellent optical characteristics is obtained. Moreover, even when the polarization maintaining optical fiber in which a fused and extended portion has been formed has been narrowed in diameter, the polarization crosstalk of the polarization maintaining optical fiber coupler of the present invention attains a value that is in no way inferior to conventional polarization maintaining optical fiber couplers.

The present invention will now be described in further detail using examples. It is to be understood that the present invention is in no way limited by these examples.

EXAMPLE 1

Figure 5A:
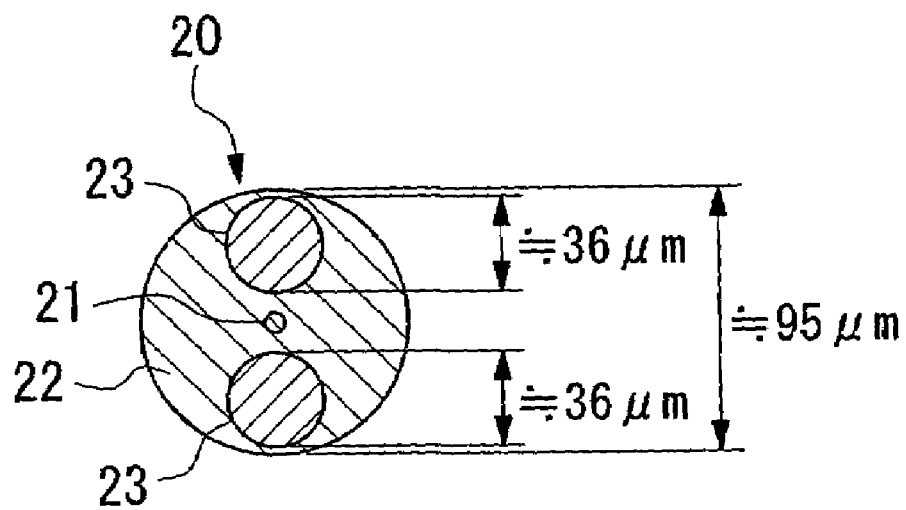
FIGS. 5A and B are typical cross-sectional views showing a relationship between PANDA type optical fibers forming a polarization maintaining optical fiber coupler.

A PANDA type optical fiber having an outer diameter of approximately 125 μm underwent diameter narrowing processing via an etching method or the like that used hydrofluoric acid. As a result, a PANDA type optical fiber 20, such as that shown in FIG. 5A, was obtained. The outer diameter of this PANDA optical fiber 20 was approximately 95 μm. The outer diameters of two stress applying portions 23 was approximately 36 μm. The distance between adjacent outer circumferences of the two stress applying portions 23 on an axis connecting the centers of the two stress applying portions 23 was approximately 19 µm. The thickness of the cladding 22 on the outer side of the two stress applying portions 23 on an axis connecting the centers of the two stress applying portions 23 was approximately 2 µm.

According to necessity, a portion of a covering layer formed by plastic or the like provided on the surfaces of two of these PANDA optical fibers 20 was removed. Next, the two PANDA optical fibers 20 were adjusted and aligned such that the respective polarization axes (i.e., the slow axis and the fast axis) of each were parallel. The two claddings 22 in the portions of the two PANDA optical fibers 20 that had undergone the diameter narrowing processing were then placed against each other, heated, and melted. In addition, they were extended in the longitudinal directions to form a fused and extended portion. As a result, a polarization maintaining optical fiber coupler having a branching ratio of 50% at a wavelength of 1550 nm was obtained.

Figure 6:
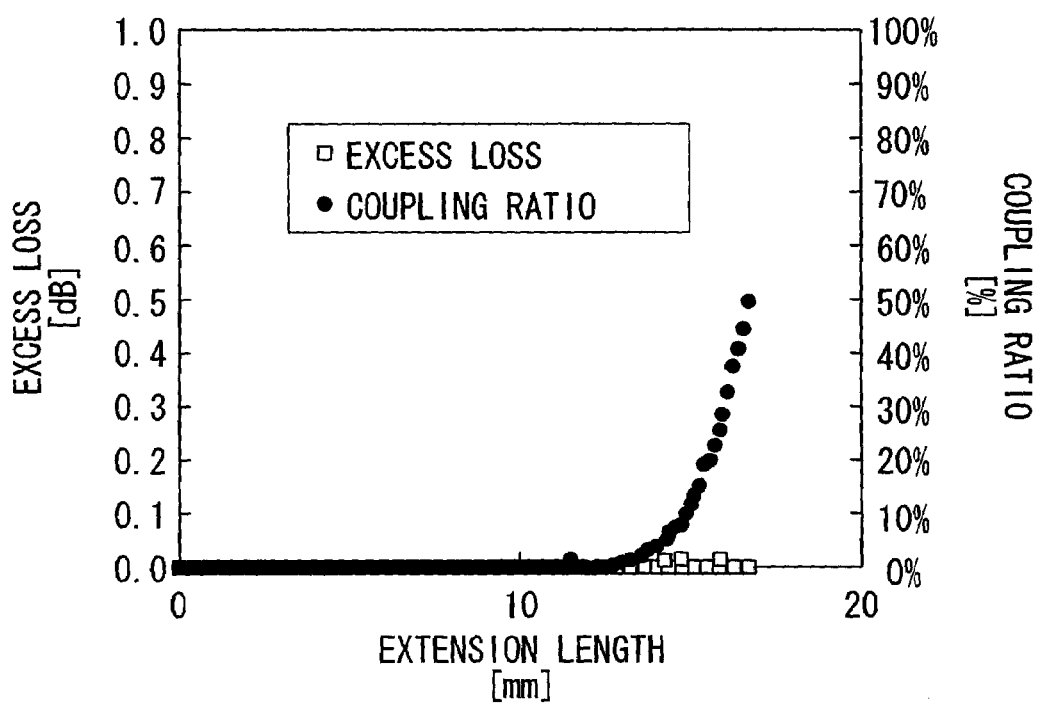
FIG. 6 is a graph showing a relationship between the extension length of a PANDA type optical fiber and the excess loss or coupling ratio of light of a polarization maintaining optical fiber coupler.

The relationship between the extension length of the PANDA optical fiber 20 and the coupling ratio or excess loss of light in the slow axial direction of this polarization maintaining optical fiber coupler is shown in FIG. 6.

From the results shown in FIG. 6, it was confirmed that there was practically no increase in excess loss prior to the polarization in the slow axial direction reaching 50% coupling.

In Example 1, a polarization maintaining optical fiber coupler having a branching ratio of 50% at a wavelength of 1550 nm is shown. However, the same tendency was also exhibited by polarization maintaining optical fiber couplers having the same structure as that of Example 1, even for a range of coupling degrees. The same tendency was also exhibited by polarization maintaining optical fiber couplers in wavelength ranges outside 1550 nm.

COMPARATIVE EXAMPLE 1

Figure 5B:
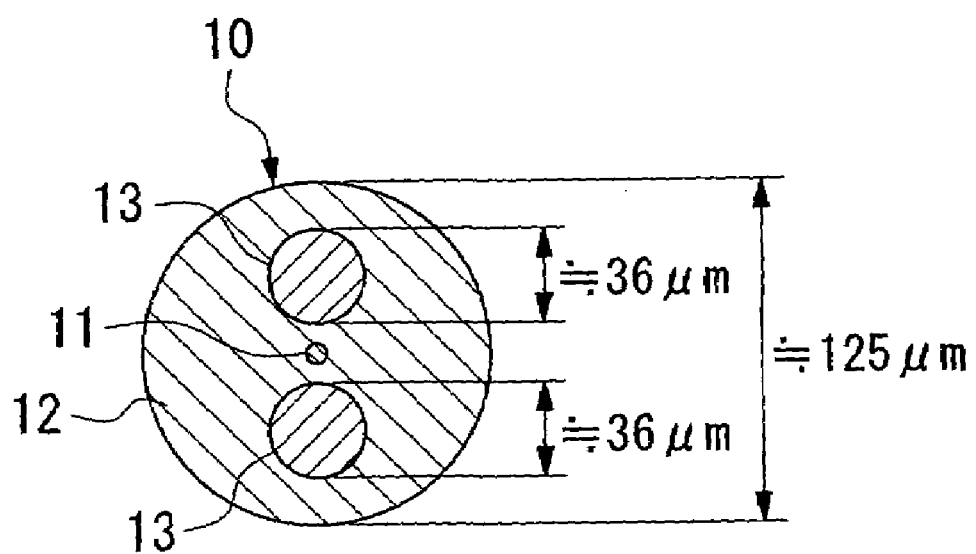

A PANDA type optical fiber 10, such as that shown in FIG. 5B, that had not undergone diameter narrowing processing was prepared. The outer diameter of this PANDA optical fiber 10 was approximately 125 µm. The outer diameters of two stress applying portions 13 were approximately 36 µm. The distance between adjacent outer circumferences of the two stress applying portions 13 on an axis connecting the centers of the two stress applying portions 13 was approximately 19 µm. The thickness of the cladding 12 on the outer side of the two stress applying portions 13 on an axis connecting the centers of the two stress applying portions 13 was approximately 17 µm.

According to necessity, a portion of a covering layer formed by plastic or the like provided on the surfaces of two of these PANDA optical fibers 10 was removed. Next, the two PANDA optical fibers 10 were adjusted and aligned such that the respective polarization axes (i.e., the slow axis and the fast axis) of each were parallel. The two claddings 12 in the portions of the two PANDA optical fibers 10 where the portion of covering layer had been removed were then placed against each other, heated, and melted. In addition, they were extended in the longitudinal directions thereof, to form a fused and extended portion. As a result, a polarization maintaining optical fiber coupler having a branching ratio of 50% at a wavelength of 1550 nm was obtained.

Figure 7:
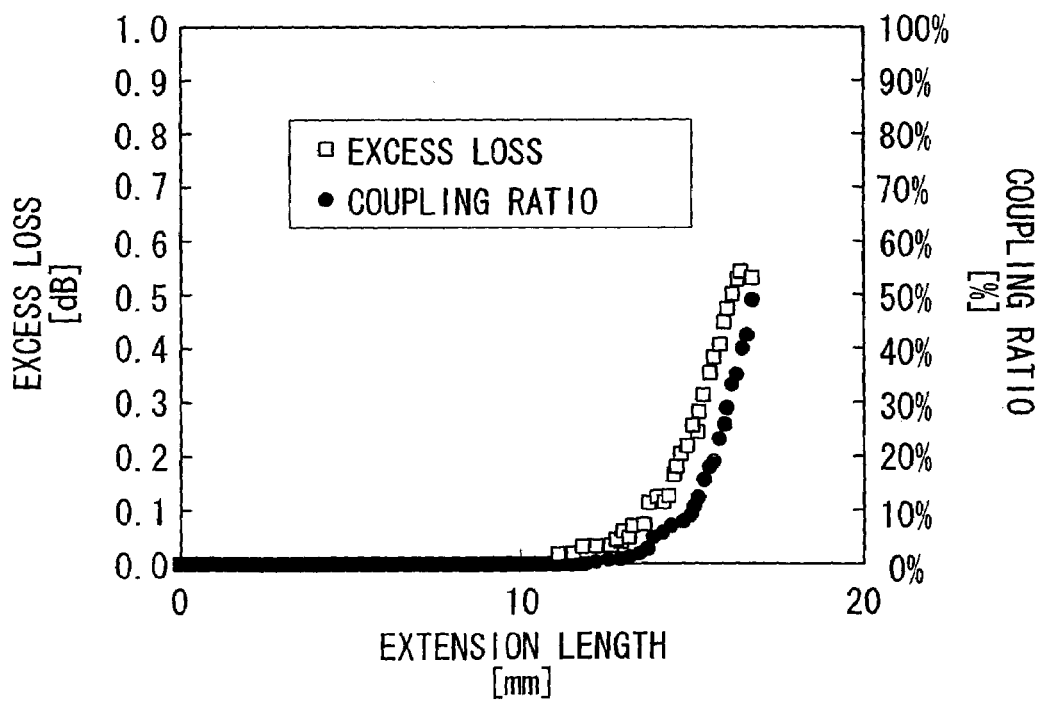
FIG. 7 is a graph showing a relationship between the extension length of a PANDA type optical fiber and the excess loss or coupling ratio of light of a polarization maintaining optical fiber coupler.

The relationship between the extension length of the PANDA optical fiber 10 and the coupling ratio or excess loss of light in the slow axial direction of this polarization maintaining optical fiber coupler is shown in FIG. 7.

From the results shown in FIG. 7, it was confirmed that if the cladding 12 on the outer side of the stress applying portions 13 on an axis connecting the centers of the two stress applying portions 13 was made thicker, the excess loss gradually increased as the PANDA optical fiber 10 was extended. In this way, if a PANDA optical fiber 10 that had not undergone diameter narrowing processing was used, it was not possible to suppress an increase in excess loss.

Figure 8A:
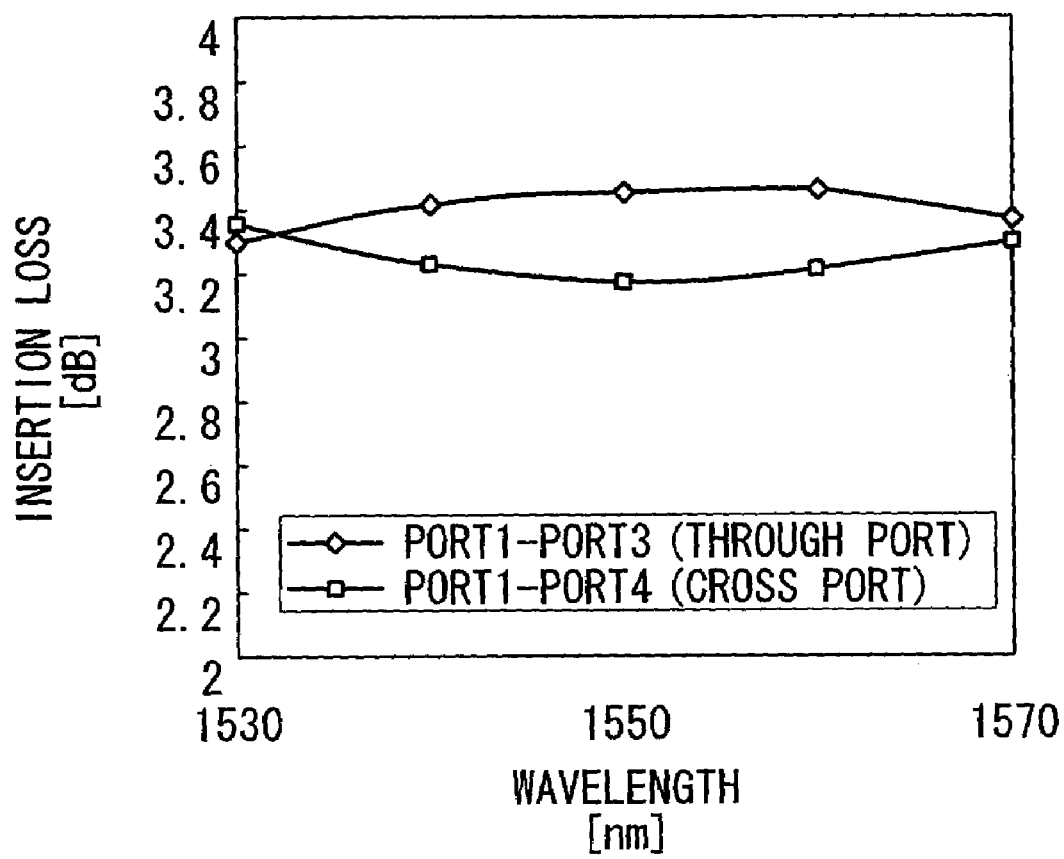
FIG. 8A is a graph showing optical characteristics of a polarization maintaining optical fiber coupler in which a branching ratio at a wavelength of 1550 nm is 50%.
Figure 8B:
FIG. 8B is a typical view of this polarization maintaining optical fiber coupler.

The optical characteristics of a polarization maintaining optical fiber coupler having a branching ratio of 50% at a wavelength of 1550 nm that is manufactured in this manner are shown in FIG. 8A. FIG. 8B is a typical view of the polarization maintaining optical fiber coupler manufactured in this example.

EXAMPLE 2

Figure 9A:
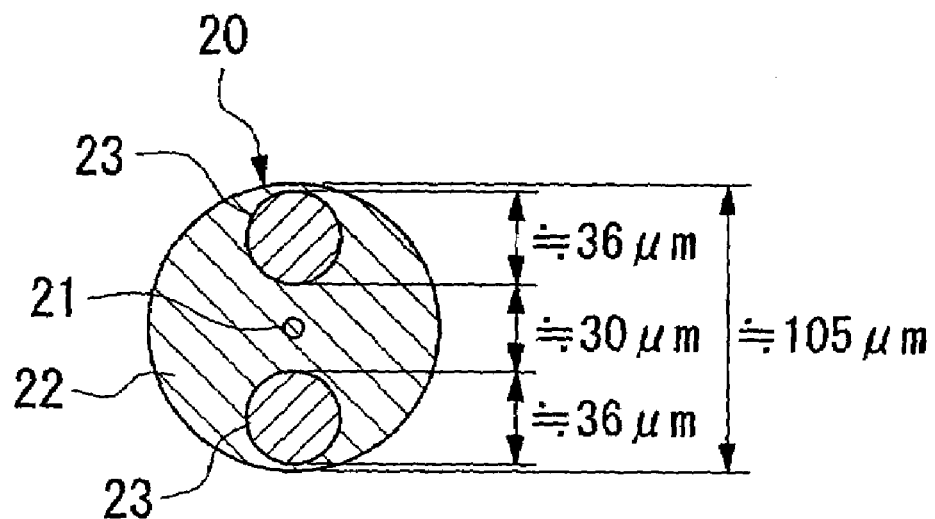
FIGS. 9A and 9B are typical cross-sectional views showing examples of PANDA type optical fibers forming a polarization maintaining optical fiber coupler.

A PANDA type optical fiber having an outer diameter of approximately 125 µm underwent diameter narrowing processing via an etching method or the like that used hydrofluoric acid. As a result, a PANDA type optical fiber 20, such as that shown in FIG. 9A, was obtained. The outer diameter of this PANDA optical fiber 20 was approximately 105 µm. The outer diameters of two stress applying portions 23 were approximately 36 µm. The distance between adjacent outer circumferences of the two stress applying portions 23 on an axis connecting the centers of the two stress applying portions 23 was approximately 30 µm. The thickness of the cladding 22 on the outer side of the two stress applying portions 23 on an axis connecting the centers of the two stress applying portions 23 was approximately 2 µm.

According to necessity, a portion of a covering layer formed by plastic or the like provided on the surfaces of two of these PANDA optical fibers 20 was removed. Next, the two PANDA optical fibers 20 were adjusted and aligned such that the respective polarization axes (i.e., the slow axis and the fast axis) of each were parallel. The two claddings 22 in the portions of the two PANDA optical fibers 20 that had undergone the diameter narrowing processing were then placed against each other, heated, and melted. In addition, they were extended in the longitudinal directions to form a fused and extended portion. As a result, a polarization maintaining optical fiber coupler having a branching ratio of 50% at a wavelength of 1550 nm was obtained.

Figure 10:
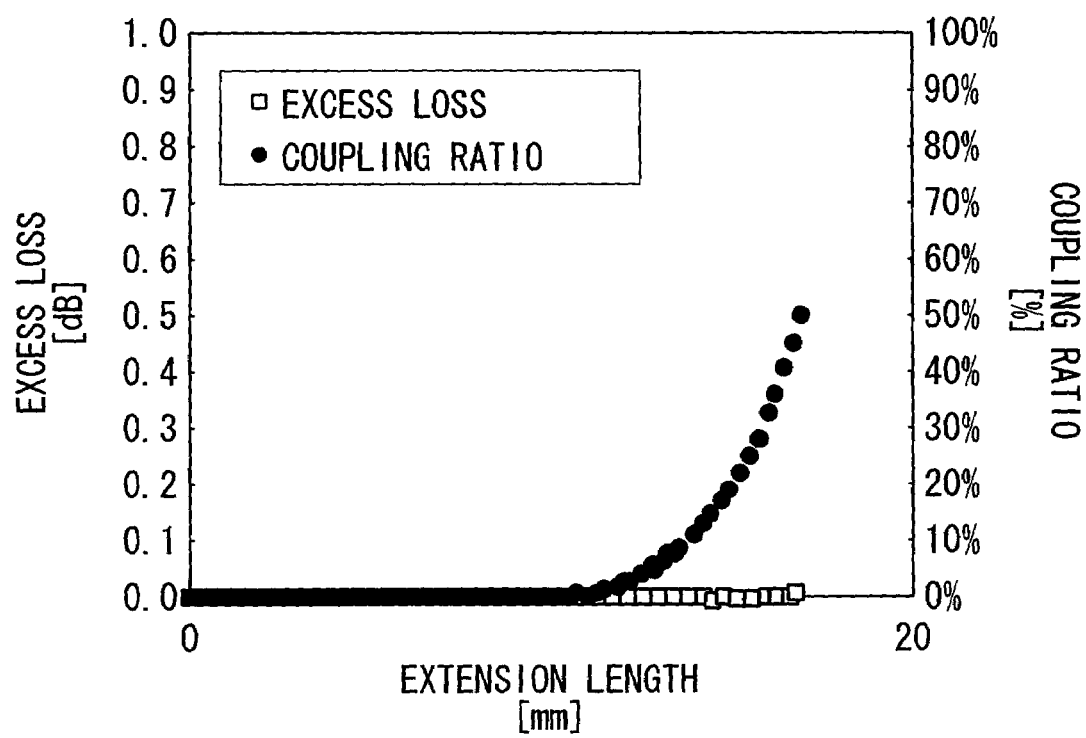
FIG. 10 is a graph showing a relationship between the extension length of a PANDA type optical fiber and the excess loss or coupling ratio of light of a polarization maintaining optical fiber coupler.

The relationship between the extension length of the PANDA optical fiber 20 and the coupling ratio or excess loss of light in the slow axial direction of this polarization maintaining optical fiber coupler is shown in FIG. 10.

From the results shown in FIG. 10, it was confirmed that there was practically no increase in excess loss prior to the polarization in the slow axial direction reaching 50% coupling.

In Example 2, a polarization maintaining optical fiber coupler having a branching ratio of 50% at a wavelength of 1550 nm is shown. However, the same tendency was also exhibited by polarization maintaining optical fiber couplers having the same structure as that of Example 2 even for a range of coupling ratios. The same tendency was also exhibited by polarization maintaining optical fiber couplers in wavelength ranges outside 1550 nm.

Figure 11A:
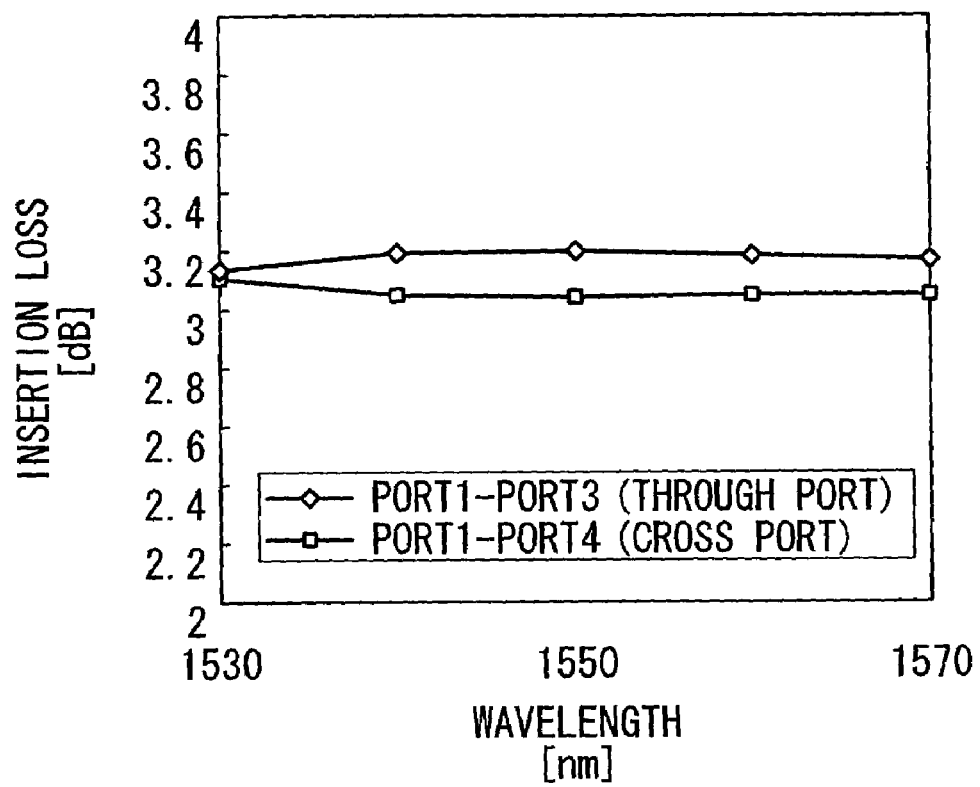
FIG. 11A is a graph showing optical characteristics of a polarization maintaining optical fiber coupler in which a branching ratio at a wavelength of 1550 nm is 50%.
Figure 11B:
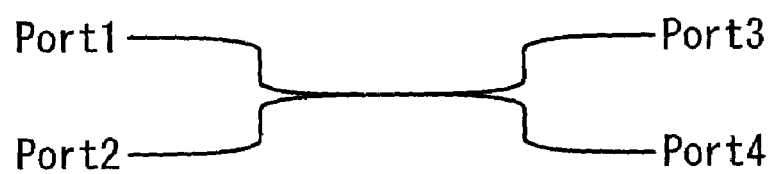
FIG. 11B is a typical view of this polarization maintaining optical fiber coupler.

The optical characteristics of a polarization maintaining optical fiber coupler having a branching ratio of 50% at a wavelength of 1550 nm that is manufactured in this manner are shown in FIG. 11A. FIG. 11B is a typical view of the polarization maintaining optical fiber coupler manufactured in this example.

Even when the optical characteristics shown in FIG. 11A are compared with those of FIG. 8A that show the optical characteristics of the polarization maintaining optical fiber coupler of Comparative Example 1, it can be seen that there is low level of loss.

COMPARATIVE EXAMPLE 2

Figure 9B:
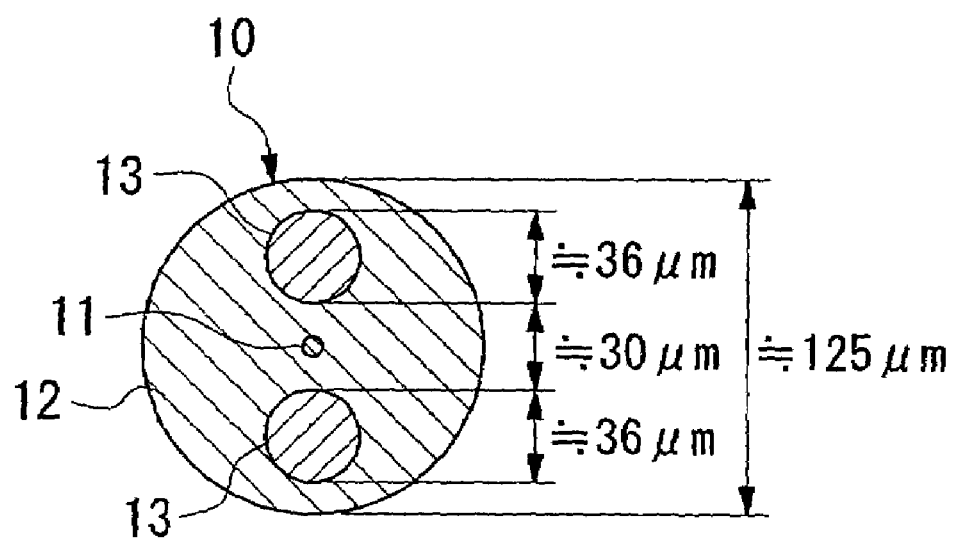

A PANDA type optical fiber 10, such as that shown in FIG. 9B, that had not undergone diameter narrowing processing was prepared. The outer diameter of this PANDA optical fiber 10 was approximately 125 µm. The outer diameters of two stress applying portions 13 was approximately 36 µm. The distance between adjacent outer circumferences of the two stress applying portions 13 on an axis connecting the centers of the two stress applying portions 13 was approximately 30 µm. The thickness of the cladding 12 on the outer side of the two stress applying portions 13 on an axis connecting the centers of the two stress applying portions 13 was approximately 10 µm.

According to necessity, a portion of a covering layer formed by plastic or the like provided on the surfaces of two of these PANDA optical fibers 10 was removed. Next, the two PANDA optical fibers 10 were adjusted and aligned such that the respective polarization axes (i.e., the slow axis and the fast axis) of each were parallel. The two claddings 12 in the portions of the two PANDA optical fibers 10 where the portion of covering layer had been removed were then placed against each other, heated, and melted. In addition, they were extended in the longitudinal directions to form a fused and extended portion. As a result, a polarization maintaining optical fiber coupler having a branching ratio of 50% at a wavelength of 1550 nm was obtained.

Figure 12:
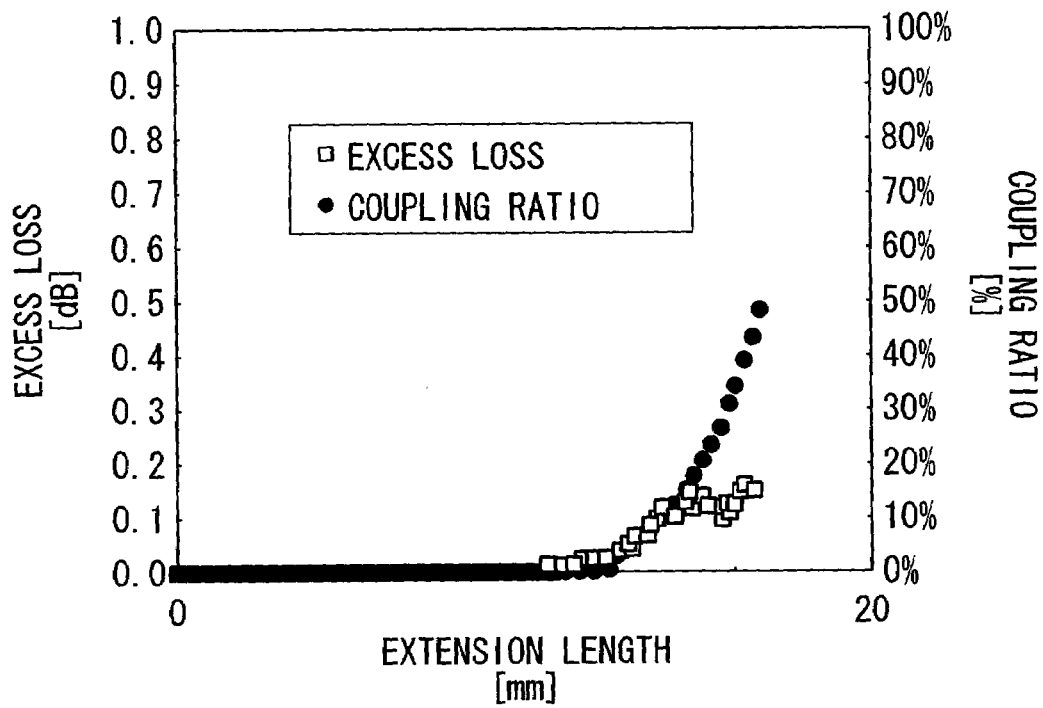
FIG. 12 is a graph showing a relationship between the extension length of a PANDA type optical fiber and the excess loss or degree of coupling of light of a polarization maintaining optical fiber coupler.

The relationship between the extension length of the PANDA optical fiber 10 and the coupling ratio or excess loss of light in the slow axial direction of this polarization maintaining optical fiber coupler is shown in FIG. 12.

From the results shown in FIG. 12, it was confirmed that if the cladding on the outer side of the two stress applying portions 13 on an axis connecting the centers of the two stress applying portions 13 was made thicker, the excess loss increased slightly as the PANDA optical fiber 10 was extended.

EXAMPLE 3

A PANDA type optical fiber having an outer diameter of approximately 125 µm underwent diameter narrowing processing via an etching method or the like that used hydrofluoric acid. As a result, a PANDA type optical fiber 20, such as that shown in FIG. 9A, was obtained. The outer diameter of this PANDA optical fiber 20 was approximately 105 µm. The outer diameters of two stress applying portions 23 was approximately 36 µm. The distance between adjacent outer circumferences of the two stress applying portions 23 on an axis connecting the centers of the two stress applying portions 23 was approximately 30 µm. The thickness of the cladding 22 on the outer side of the two stress applying portions 23 on an axis connecting the centers of the two stress applying portions 23 was approximately 2 µm.

According to necessity, a portion of a covering layer formed by plastic or the like provided on the surfaces of two of these PANDA optical fibers 20 was removed. Next, the two PANDA optical fibers 20 were adjusted and aligned such that the respective polarization axes (i.e., the slow axis and the fast axis) of each were parallel. The two claddings 22 in the portions of the two PANDA optical fibers 20 that had undergone the diameter narrowing processing were then placed against each other, heated, and melted. In addition, they were extended in the longitudinal directions to form a fused and extended portion. As a result, a polarization beam combiner at a wavelength of 1480 nm was obtained.

At this time, both the slow polarization and the fast polarization were monitored and the extension conditions were optimized such that there was 100% coupling at one polarization and 0% coupling at the other polarization.

Figure 13:
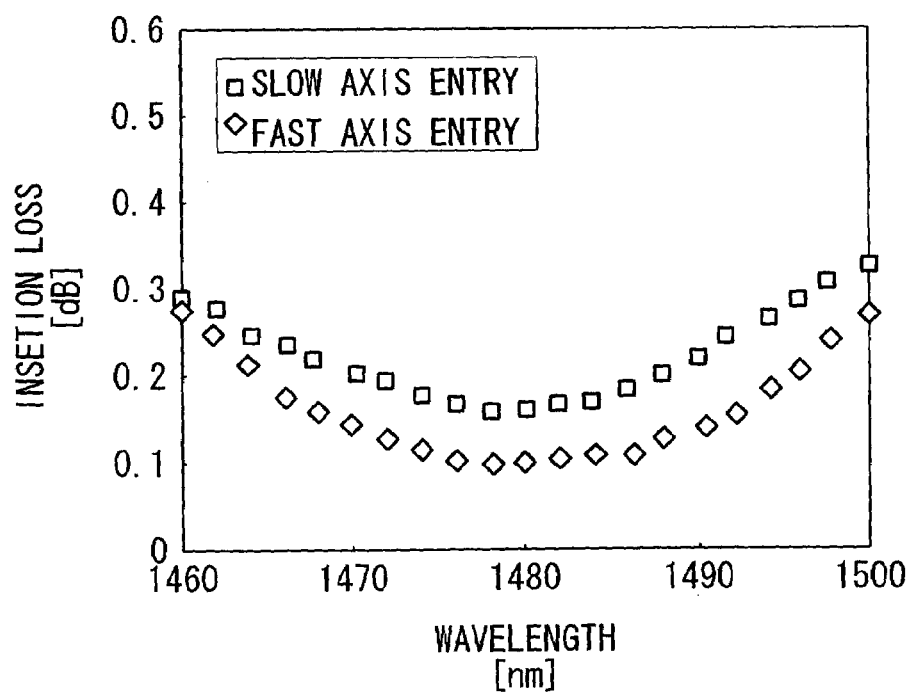
FIG. 13 is a graph showing optical characteristics of a polarization beam combiner.

Optical characteristics of the polarization beam combiner manufactured in this manner are shown in FIG. 13.

From the results shown in FIG. 13, it was confirmed that there was a low level of loss for both slow polarization and fast polarization.

COMPARATIVE EXAMPLE 3

A PANDA type optical fiber 10, such as that shown in FIG. 9B, that had not undergone diameter narrowing processing was prepared. The outer diameter of this PANDA optical fiber 10 was approximately 125 µm. The outer diameters of two stress applying portions 13 were approximately 36 µm. The distance between adjacent outer circumferences of the two stress applying portions 13 on an axis connecting the centers of the two stress applying portions 13 was approximately 19 µm. The thickness of the cladding 12 on the outer side of the two stress applying portions 13 on an axis connecting the centers of the two stress applying portions 13 was approximately 17 µm.

According to necessity, a portion of a covering layer formed by plastic or the like provided on the surfaces of two of these PANDA optical fibers 10 was removed. Next, the two PANDA optical fibers 10 were adjusted and aligned such that the respective polarization axes (e., the slow axis and the fast axis) of each were parallel. The two claddings 12 in the portions of the two PANDA optical fibers 10 where the portion of covering layer had been removed were then placed against each other, heated, and melted. In addition, they were extended in the longitudinal directions to form a fused and extended portion. As a result, a polarization beam combiner at a wavelength of 1480 nm was obtained.

At this time, both the slow polarization and the fast polarization were monitored and the extension conditions were optimized such that there was 100% coupling at one polarization and 0% coupling at the other polarization.

Figure 14:
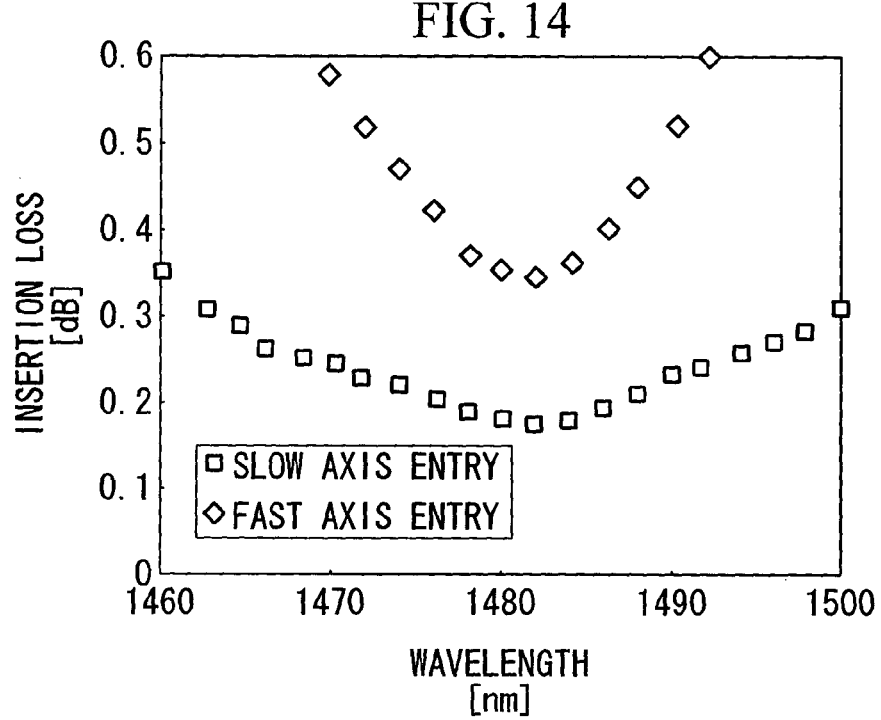
FIG. 14 is a graph showing optical characteristics of a polarization beam combiner.

Optical characteristics of the polarization beam combiner manufactured in this manner are shown in FIG. 14.

From the results shown in FIG. 14, it was confirmed that, compared with Example 3, not only was there a large degree of loss, but there was a sizeable difference between the slow polarization insertion loss wavelength dependency and the fast polarization insertion loss wavelength dependency, so that the range of applications where this polarization beam combiner could be used are limited.

Figure 15:
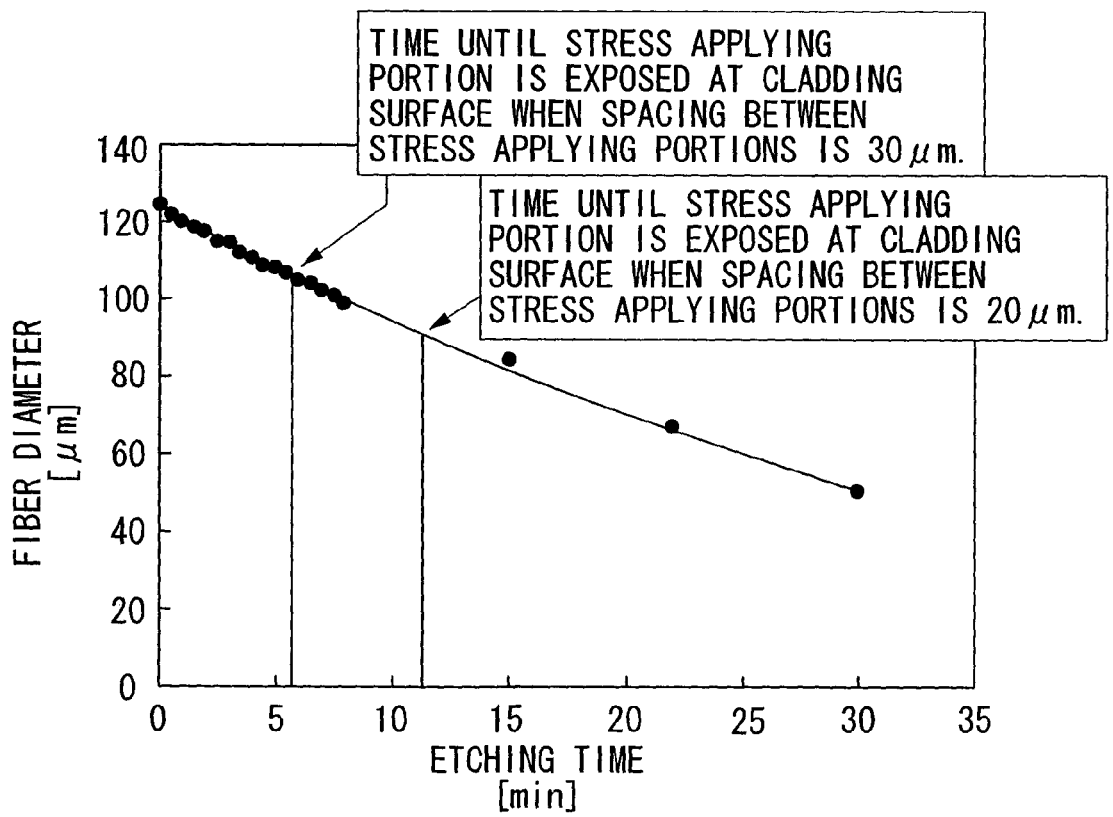
FIG. 15 is a graph showing a relationship between the outer diameter of an optical fiber and the diameter narrowing processing time (etching time) of a polarization maintaining optical fiber.

Next, the relationship between the diameter narrowing processing time (i.e., the etching time) and the outer diameter of the optical fiber are shown in FIG. 15. From FIG. 15 it was confirmed that in the PANDA optical fiber 20 of Example 2, in which the distance between adjacent outer circumferences of the two stress applying portions 23 was approximately 30 µm, the time required to expose the stress applying portions 23 to the surface of the cladding 22 was approximately half that required by the PANDA optical fiber 20 of Example 1, in which the distance between adjacent outer circumferences of the two stress applying portions 23 was approximately 20 µm.

If a PANDA optical fiber 20 having a structure such as that described in Example 2 is used, only a short length of diameter narrowing processing time is required to thin down the cladding 22 on the outside of the stress applying portions 23, thereby allowing the work time to be shortened considerably. Moreover, because the outer diameter of the portion of the PANDA optical fiber 20 that has undergone diameter narrowing processing is 100 μm or greater in the PANDA optical fiber 20 of Example 2, handling of this optical fiber poses no problems. Note that if a portion of the PANDA optical fiber 20 is abruptly narrowed that portion tends to be easily bent, resulting in the PANDA optical fiber 20 being easily broken unless it is handled carefully. Therefore, it is desirable that the diameter narrowing processing is not performed to excess.

Next, the tensile strength of a polarization maintaining optical fiber coupler manufactured using PANDA optical fibers in which the stress applying portions have been exposed at the surface of the cladding was compared with the tensile strength of a polarization maintaining optical fiber coupler manufactured using PANDA optical fibers that had undergone diameter narrowing processing such that 2 μm of cladding was left on the outside of the stress applying portions on an axis connecting the centers of the two stress applying portions. The extension conditions at this time were set the same as for the polarization maintaining optical fiber coupler of Example 2 in which the branching ratio at a wavelength of 1550 nm was 50%.

Figure 16:
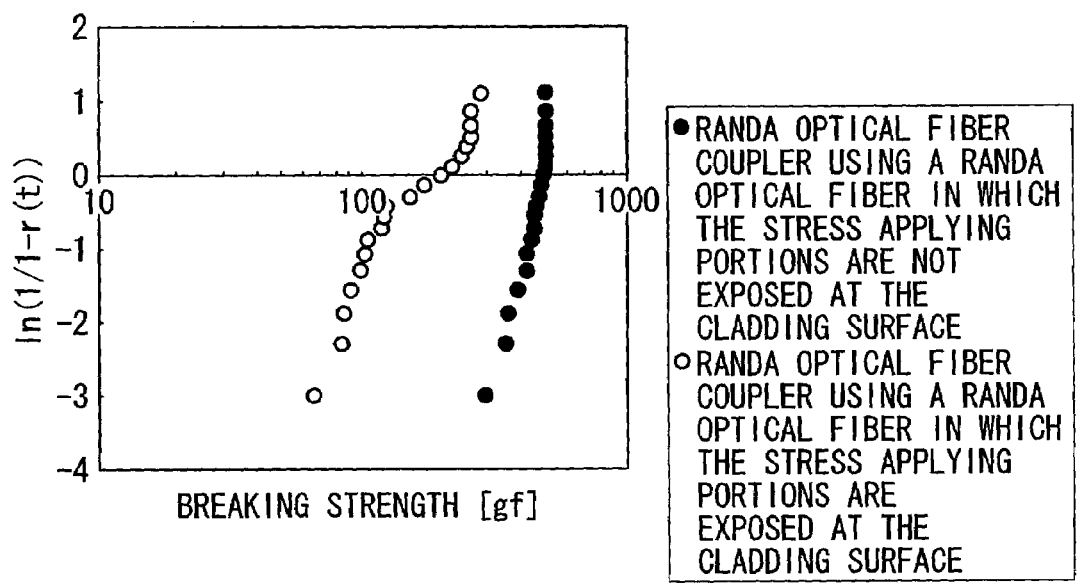
FIG. 16 is a graph showing the Weibull intensity distribution of a polarization maintaining optical fiber coupler.

The Weibull intensity distributions of the polarization maintaining optical fiber couplers are shown in FIG. 16.

From FIG. 16 it was understood that the breaking strength of the polarization maintaining optical fiber coupler in which the stress applying portions had been exposed at the surface of the cladding was less than half the breaking strength of the polarization maintaining optical fiber coupler in which the stress applying portions had not been exposed at the surface of the cladding. Accordingly, it is preferable that, to a certain extent, a thin layer of cladding remain present on the outer side of the stress applying portions.

Figure 17:
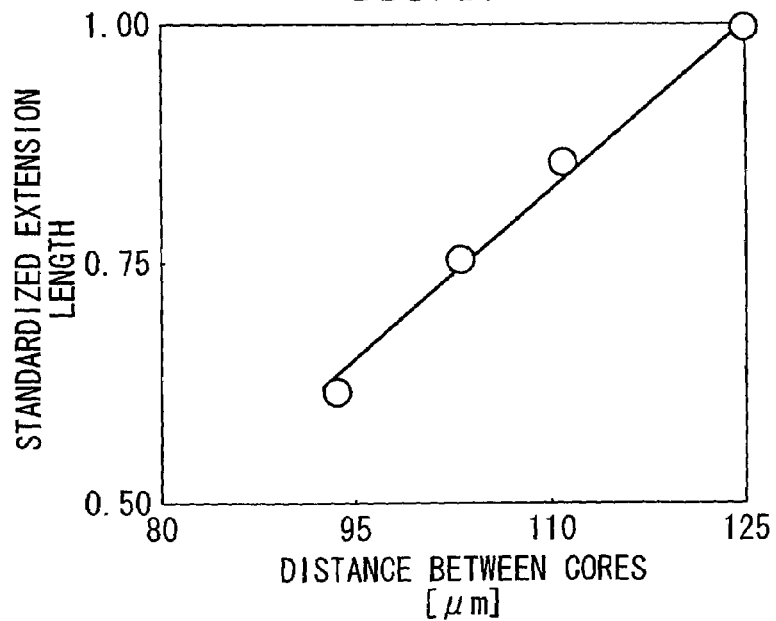
FIG. 17 is a graph showing a relationship between a standardized extension length and the outer diameter of an optical fiber (the distance between the cores of two PANDA type optical fibers).
Figure 18:
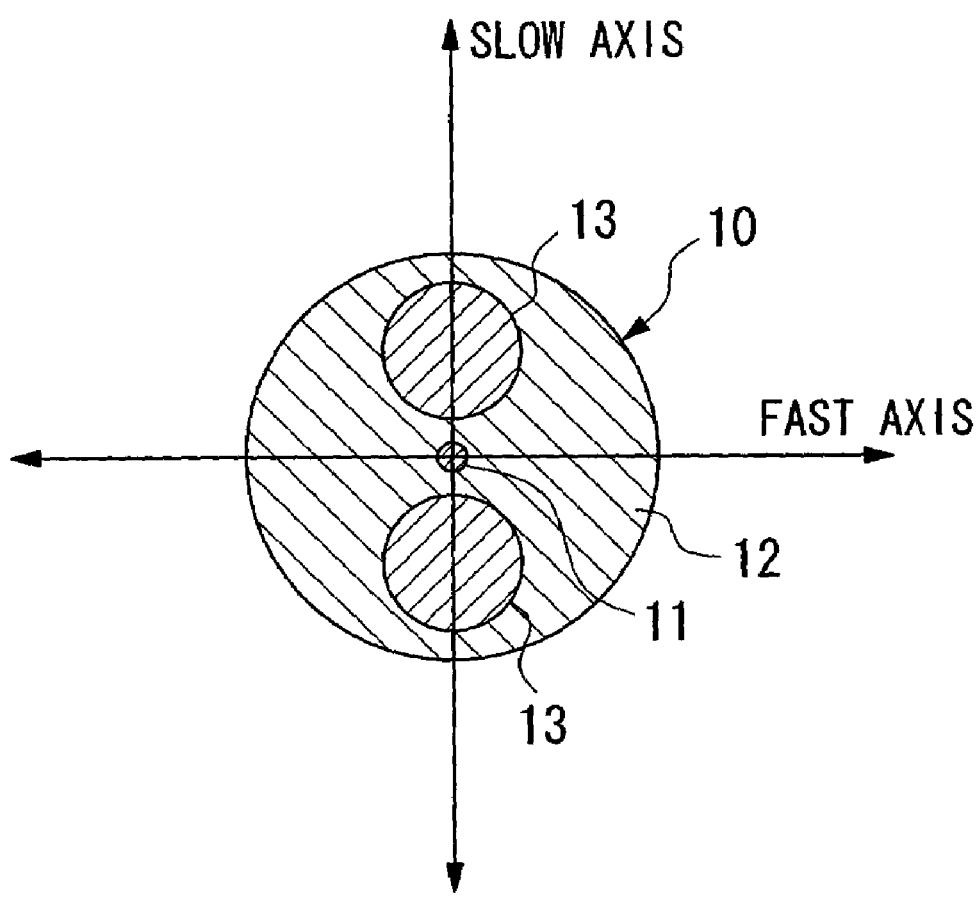
FIG. 18 is a cross-sectional view showing an example of a PANDA type optical fiber in which the spacing between stress applying portions that have not undergone diameter narrowing processing is 20 µm or less.
Figure 19:
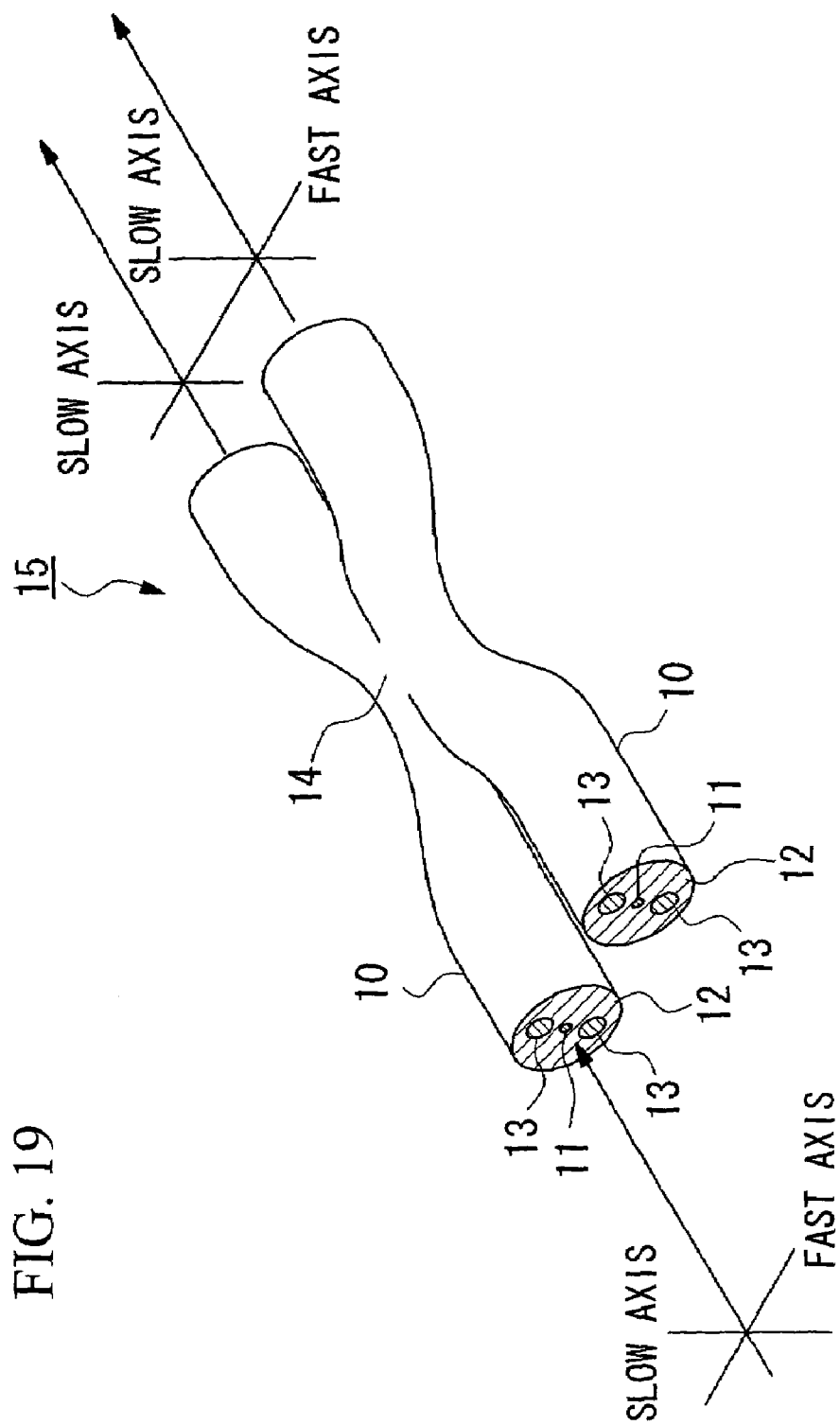
FIG. 19 is a perspective view showing a polarization maintaining optical fiber coupler manufactured using normal PANDA type optical fibers.

Next, the relationship between a standardized extension length and the outer diameter of an optical fiber (the distance between the cores of two PANDA type optical fibers) is shown in FIG. 17.

From FIG. 17 it was understood that, after a diameter narrowing processing had been performed on the PANDA optical fiber, if the PANDA optical fiber was then heated and melted the standardized extension length was shorter than when the diameter narrowing processing was not performed on the PANDA optical fiber. From this fact it was discovered that a reduction in size can be achieved in a polarization maintaining optical fiber coupler if this is manufactured after diameter narrowing processing has been performed on a PANDA optical fiber.

As has been described above, in the polarization maintaining optical fiber coupler of the present invention, a portion of the cladding of the polarization maintaining optical fiber is narrowed in diameter via an etching method or grinding method or the like, and a fused and extended portion is formed at the narrowed portion of the polarization maintaining optical fiber. As a result, there is no increase in excess loss during the manufacturing process of the polarization maintaining optical fiber coupler and the resulting polarization maintaining optical fiber coupler has excellent optical characteristics. If, in this way, there is no increase in excess loss during the extending process of the polarization maintaining optical fiber, there is no longer any need for processing to adjust the cycle of variation in excess loss and to adjust the cycle of variation in the coupling ratio as the polarization maintaining optical fiber is being extended, as is the case with a conventional polarization maintaining optical fiber coupler. Consequently, an improvement in the production yield can be achieved.

Furthermore, because there is a reduction in the wavelength dependency of the excess loss in the polarization maintaining optical fiber coupler of the present invention, the polarization maintaining optical fiber coupler of the present invention is suitable for applications in which the used frequency band is extremely broad.

Moreover, because the basic manufacturing method used for the polarization maintaining optical fiber coupler of the present invention is the same as that used for a conventional polarization maintaining optical fiber coupler, the polarization maintaining optical fiber coupler of the present invention provides excellent productivity and also a high level of reliability.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of manufacturing a polarization maintaining optical fiber coupler including a plurality of PANDA type polarization maintaining optical fibers, each having a core, a cladding surrounding said core, and two stress applying portions within said cladding that are arranged symmetrically around said core, said plurality of PANDA type polarization maintaining optical fibers being arranged parallel to each other and having a portion in a longitudinal direction thereof fused and extended to form a fused and extended portion, comprising:

removing an outer peripheral portion of said cladding in a portion in a longitudinal direction of at least one of said PANDA type polarization maintaining optical fibers to narrow a diameter of said at least one of said PANDA type polarization maintaining optical fibers without exposing said stress applying portions; and fusing and extending the narrowed portion to form said fused and extended portion, wherein the thickness of said cladding outside said two stress applying portions is larger than 0 μm and 10 μm or less on an axis connecting the centers of said two stress applying portions at the fused and extended portion of said PANDA type polarization maintaining optical fiber.

2. The method of manufacturing a polarization maintaining optical fiber coupler according to claim 1, wherein said plurality of polarization maintaining optical fibers each comprises a polarization maintaining optical fiber in which a distance between adjacent outer circumferences of said two stress applying portions is 20 μm or more.

3. The method of manufacturing a polarization maintaining optical fiber coupler according to claim 1, wherein a length of said narrowed portion of said polarization maintaining optical fibers is 40 mm or less.

4. A polarization maintaining optical fiber coupler comprising:

a plurality of PANDA type polarization maintaining optical fibers, each having
a core,
a cladding surrounding said core, and
two stress applying portions within said cladding that are arranged symmetrically around said core,
said plurality of PANDA type polarization maintaining optical fibers being arranged parallel to each other and having a portion in a longitudinal direction thereof fused and extended so as to form a fused and extended portion,
wherein the ratio of a diameter of said core/a diameter of said cladding in at least one of said PANDA type polarization maintaining optical fibers at said fused and extended portion is greater than the ratio of a diameter of said core/a diameter of said cladding in portions of said PANDA type polarization maintaining optical fibers that do not form said fused and extended portion,
wherein the thickness of said cladding outside said two stress applying portions is larger than 0 µm and 10 µm or less on an axis connecting the centers of said two stress applying portions at the fused and extended portion of said PANDA type polarization maintaining optical fiber.

5. A polarization maintaining optical fiber coupler comprising:
a plurality of PANDA type polarization maintaining optical fibers, each having
a core,
a cladding surrounding said core, and
two stress applying portions within said cladding that are arranged symmetrically around said core,
said plurality of PANDA type polarization maintaining optical fibers being arranged parallel to each other and having a portion in a longitudinal direction thereof fused and extended so as to form a fused and extended portion,
wherein the ratio of a distance between said two stress applying portions/a diameter of said cladding in at least one of said PANDA type polarization maintaining optical fibers at said fused and extended portion is greater than the ratio of a distance between said two stress applying portions/a diameter of said cladding in portions of said PANDA type polarization maintaining optical fibers that do not form said fused and extended portion, and
wherein the thickness of said cladding outside said two stress applying portions is larger than 0 µm and 10 µm or less on an axis connecting the centers of said two stress applying portions at the fused and extended portion of said PANDA type polarization maintaining optical fiber.

6. The polarization maintaining optical fiber coupler as in claim 4 or 5,
wherein said plurality of polarization maintaining optical fibers each comprises a polarization maintaining optical fiber in which a distance between adjacent outer circumferences of said two stress applying portions is 20 µm or more.

7. The polarization maintaining optical fiber coupler as in claim 4 or 5,
wherein said polarization maintaining optical fiber coupler is a polarization beam combiner.

8. The polarization maintaining optical fiber coupler as in claim 4 or 5,
wherein said polarization maintaining optical fiber coupler is a polarization beam splitter.

9. The polarization maintaining optical fiber coupler as in claim 4 or 5,
wherein said polarization maintaining optical fiber coupler is a polarization maintaining wavelength division multiplex coupler.

* * * * *